May 9, 1967     N. E. EBERHART ET AL     3,319,096

THERMALLY PROTECTED DYNAMOELECTRIC MACHINE

Filed Nov. 16, 1964

WITNESSES
Theodore F. Wrobel
James F. Young

INVENTORS
Noah E. Eberhart
& Thomas Charlton
BY
ATTORNEY

United States Patent Office 3,319,096
Patented May 9, 1967

3,319,096
THERMALLY PROTECTED DYNAMOELECTRIC MACHINE
Noah E. Eberhart, Bath Township, Lima, and Thomas Charlton, Lima, Ohio, assignors to Westinghouse Electric Corporation, East Pittsburgh, Pa., a corporation of Pennsylvania
Filed Nov. 16, 1964, Ser. No. 411,262
4 Claims. (Cl. 310—68)

The present invention relates to thermally protected dynamoelectric machines, and more particularly to improved attaching means for thermal protectors in such machines.

Electric motors, and other dynamoelectric machines, are frequently protected against overheating by thermally responsive protective devices which respond to the motor temperature, and usually also to motor current, to disconnect the motor from the line up overheating or overload. Such protective devices are often attached to the motor winding so as to respond directly to the winding temperature. When this is done it is necessary to attach the protector securely and permanently to the winding in good heat transfer relation therewith, so that the protector will accurately follow the winding temperature. The protector must also be attached in such a manner that the winding insulation is not damaged and so that the protector itself is properly electricaly insulated from the winding and from ground. This has usually been done heretofore by means of cotton string or cord which was laced through the winding and securely tied around the protector to hold it in place in contact with the winding. This method of attaching the protector is relatively satisfactory in meeting the requirements indicated above but it requires a considerable amount of time and skill to properly attach the protector to the winding in this way and thus is undesirably expensive. Other proposed methods of attaching the protector involving the use of such materials as paper tape reinforced with wire, or more complicated devices using metal straps, have proved to be unsatisfactory from the standpoint either of cost or of safety and reliability. A need has existed therefore for a simple but reliable and low cost means of attaching a thermal protective device to a motor winding.

The principal object of the present invention is to provide a thermally protected dynamoelectric machine in which a thermal protector is attached to the winding of the machine in a simple and inexpensive but reliable manner which meets all the requirements previously indicated.

Another object of the invention is to provide a thermally protected dynamoelectric machine in which a simple and inexpensive insulating clamp member is utilized to attach a thermal protector to a winding of the machine.

Other objects and advantages of the invention will be apparent from the following detailed description, taken in connection with the accompanying drawing, in which.

Figure 1:
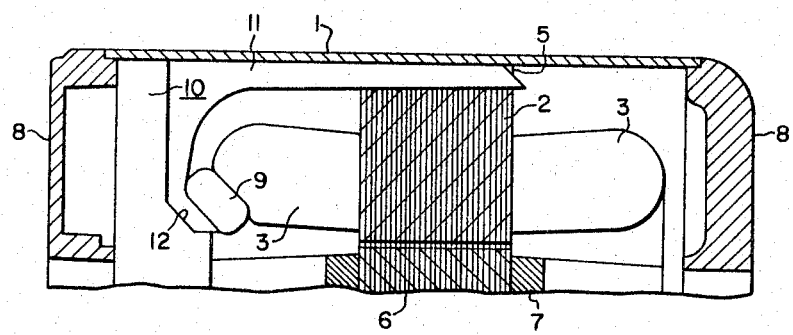
FIGURE 1 is a partial longitudinal sectional view of an electric motor embodying the invention.
Figure 2:
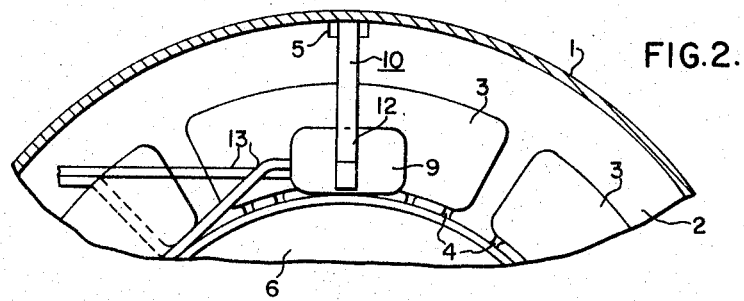
FIG. 2 is a fragmentary end elevation of the machine of FIG. 1 with the end bracket removed.
Figure 3:
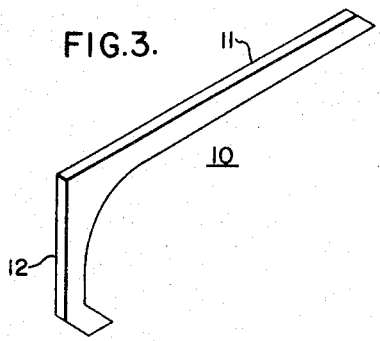
FIG. 3 is a perspective view of a clamp member.

While the invention is applicable to dynamoelectric machines of any type or size, it is shown in the drawing for the purpose of illustration applied to a single-phase motor of typical construction. The motor shown in the drawing has a frame 1 in which is supported a laminated stator core 2, which may be of any desired or usual construction and which carries primary windings 3 of any suitable type disposed in the usual manner in slots 4. In accordance with usual practice the stator core 2 has a longitudinal slot 5 in its outer periphery which is utilized for properly aligning the laminations during assembly of the core or which may be used for properly orienting the core in the frame. The stator core 2 may be supported in the frame 1 in any desired manner as by pressing it into the frame. The motor also has a rotor comprising a laminated rotor core 6 carrying a secondary winding shown as a squirrel cage winding 7. The ends of the frame 1 are closed by end brackets 8 of any suitable construction which carry bearings (not shown) in which the shaft of the motor is supported.

The motor is protected against overheating by means of a thermally responsive protective device 9 which may be of any suitable or usual type that responds to temperature to effect disconnection of the motor from the line. The end turn portions of the motor winding 3 extend beyond the ends of the core in the usual manner, as shown, and in order to obtain the most effective protection the thermal protector 9 is applied directly to the end turn portion of the winding 3 to closely follow the winding temperature.

As previously explained, it is necessary to attach the protector 9 to the winding 3 in a reliable and permanent manner in such a way that the protector is held tightly against the winding so as to enable it to closely follow changes in winding temperature, but it must be attached in such a way that the winding insulation is not damaged and that the protector itself is electrically insulated both from the winding and from ground. For this purpose a clamp member 10 is provided. The clamp member 10 may be made of any suitable rigid insulating material, such as a plastic laminate, and in the preferred embodiment shown in the drawing, the clamping member 10 has an elongated supporting portion 11 which is made of the proper size to fit in the slot 5 of the stator core. The clamping member 10 also has a generally hook shaped clamping portion 12 extending down from the supporting portion 11 and properly shaped to fit over and tightly engage the protector 9.

In applying the protector to the motor, it is placed on the end turn portion of the winding 3 as shown in the drawing with the leads 13 of the protector extending to one side for connection in the motor circuit. The clamp 10 is then placed over the protector with the hook shaped portion 12 engaging the protector and the supporting portion 11 extending into the slot 5 of the core, and the clamp is pushed or driven into the slot so that the clamp is tightly supported on the core between the core and the frame. The supporting portion 11 of the clamp may be slightly tapered or bowed if desired to facilitate driving the clamp into place and tightly retaining it in position.

It will be seen that the clamp engages the protector 9 and holds it tightly against the winding in the desired position and in good thermal relation to the winding so that the protector accurately responds to the winding temperature. Since the clamp is of insulating material, the protector 8 is adequately insulated from ground and since it is pressed against the winding by the clamp, and the clamp does not itself touch the winding, there is no risk of damage to the winding insulation. Thus the requirements previously indicated are fully met since the protector is tightly and permanently held in place in good thermal relation with the winding but with no risk of damage to the winding insulation or of grounding the protector. The clamp itself is a simple member which can be easily punched or otherwise formed from insulating material of low cost and which is quickly and easily inserted into position. Thus, a reliable and low cost means of securing the protector in position is provided.

Figure 4:
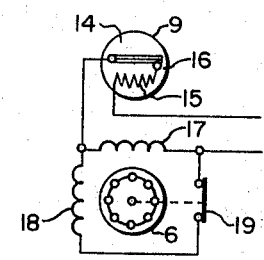
FIG. 4 is a schematic diagram illustrating the electrical connections of a typical protective device.

The thermal protector 9 may be of any desired type and is shown schematically in FIG. 4 as being of a conventional type which includes a bimetallic thermally responsive element 14 and a heater 15 which is adapted to carry the motor current and to heat the bimetallic element 14 accordingly. Since the protector 9 is in thermal contact with the winding it will respond either to overheating of the winding or to excessive motor current, and will open its contact 16 when the temperature of the bimetal 14 exceeds a predetermined value.

The protector 9 may be used in any desired circuit for protection of the motor and a typical connection is shown in FIG. 4. In this figure there is shown a single-phase motor of the split-phase type having a main primary winding 17 and an auxiliary primary winding 18, with a speed-responsive switch 19 for disconnecting the auxiliary winding after the motor has started. The protector 9 is shown as being connected directly in series in the line so as to carry the motor current, and it will be seen that excessive current flowing through the heater 15 will heat the bimetal 14 above its operating temperature to cause it to open the contact 16 and disconnect the motor from the line. Similarly, the bimetal 14 may be heated above its operating temperature by overheating of the winding with which the protector is in thermal contact, which will also cause the contact 16 to open. Thus the motor is completely protected against overheating due to any cause.

It will be understood that the invention is applicable to any type of thermal protector which can be applied directly to the winding and that it is applicable to motors of any type or size. The clamp member 10 may be supported on the stator core in any desired manner which will retain it reliably and permanently in position, and it may be of any suitable configuration to engage the particular protector with which it is to be used.

It should now be apparent that an attaching means for thermal protectors has been provided which makes it possible to reliably and permanently attach the protector to a motor winding in a simple and inexpensive manner which meets all the necessary requirements and which is substantially lower in cost than the methods which have previously been used for attaching such protectors. A preferred embodiment of the invention has been shown and described for the purpose of illustration but it will be understood that various other embodiments and modifications are possible and all such modifications and embodiments are within the scope of the invention.

We claim as our invention:

1. In a dynamoelectric machine having a frame, a stator core member supported in the frame, a winding on the stator core member, a thermally responsive protective device disposed on said winding, and a rigid clamp member of insulating material supported on said core, said clamp member engaging the protective device and holding it tightly in place on the winding in good thermal relation therewith.

2. In a dynamoeletcric machine having a frame, a stator core member supported in the frame, a winding on the stator core member having an end portion extending beyond the core member, a thermally responsive protective device disposed on the end portion of said winding, and a rigid clamp member of insualting material supported on said core member, said clamp member having a portion extending over the protective device and engaging the protective device to hold it tightly in place on the winding in good thermal relation therewith.

3. In a dynamoelectric machine having a frame, a stator core member supported in the frame, a winding on the stator core member having an end portion extending beyond the core member, a thermally responsive protective device disposed on the end portion of said winding, and a rigid clamp member of insulating material having a portion extending between the core member and the frame to be supported therebetween and having a portion extending over the protective device and engaging the protective device to hold it tightly in place on the winding in good thermal relation therewith.

4. In a dynamoelectric machine having a frame, a stator core member supported in the frame, said stator core member having a longitudinal slot in its outer periphery, a winding on the stator core member having an end portion extending beyond the core member, a thermally responsive protective device disposed on the end portion of the winding, and a rigid clamp member of insulating material, said clamp member having an elongated portion disposed in said slot of the core member to be supported between the core member and the frame, and the clamp member having a generally hook shaped portion extending over the protective device and engaging the protective device to hold it tightly in place on the winding in good thermal relation therewith.

References Cited by the Examiner
UNITED STATES PATENTS

| | | | |
|---|---|---|---|
| 2,089,249 | 8/1937 | Bruns | 310—68 |
| 2,629,061 | 2/1953 | Swarthout | 310—42 |
| 2,821,640 | 1/1958 | Fleckenstein | 310—68 |
| 3,083,309 | 3/1963 | Brown | 310—68 |
| 3,183,383 | 5/1965 | Slonneger | 310—68 |
| 3,219,856 | 11/1965 | Dunwiddie | 310—68 |

References Cited by the Applicant
UNITED STATES PATENTS

| | | |
|---|---|---|
| 3,131,322 | 4/1964 | Pleiss et al. |
| 3,135,883 | 6/1964 | Phillips. |

MILTON O. HIRSHFIELD, *Primary Examiner.*

J. D. MILLER, *Assistant Examiner.*